United States Patent [19]

Ochs et al.

[11] 3,908,926
[45] Sept. 30, 1975

[54] ROLL SUPPORTING MECHANISM
[75] Inventors: Gordon M. Ochs, Washougal, Wash.; Raymond Wheeler, Independence, Mo.
[73] Assignee: Tidland Corporation, Camas, Wash.
[22] Filed: May 17, 1974
[21] Appl. No.: 470,745

[52] U.S. Cl................................................. 242/72 B
[51] Int. Cl............................................. B65h 75/18
[58] Field of Search................... 242/72, 72 B, 68.2

[56] References Cited
UNITED STATES PATENTS
3,048,345  8/1962  Willard.............................. 242/72 B
3,104,074  9/1963  Karr.................................. 242/72 B
3,391,878  7/1968  Naccara............................ 242/72 B
3,414,210  12/1968 Gaudin.............................. 242/72 B Primary Examiner—Edward J. McCarthy
Attorney, Agent, or Firm—Klarquist, Sparkman, Campbell, Leigh, Hall & Whinston

[57] ABSTRACT

A roll support having a sleeve which fits in a roll and is supported by bearings on the inboard end of a cantilever spindle which projects through the sleeve. The outboard portion of the spindle is of reduced diameter to provide a space to receive an elastomer tube which can be expanded to force cleats outwardly into engagement with the roll.

10 Claims, 4 Drawing Figures

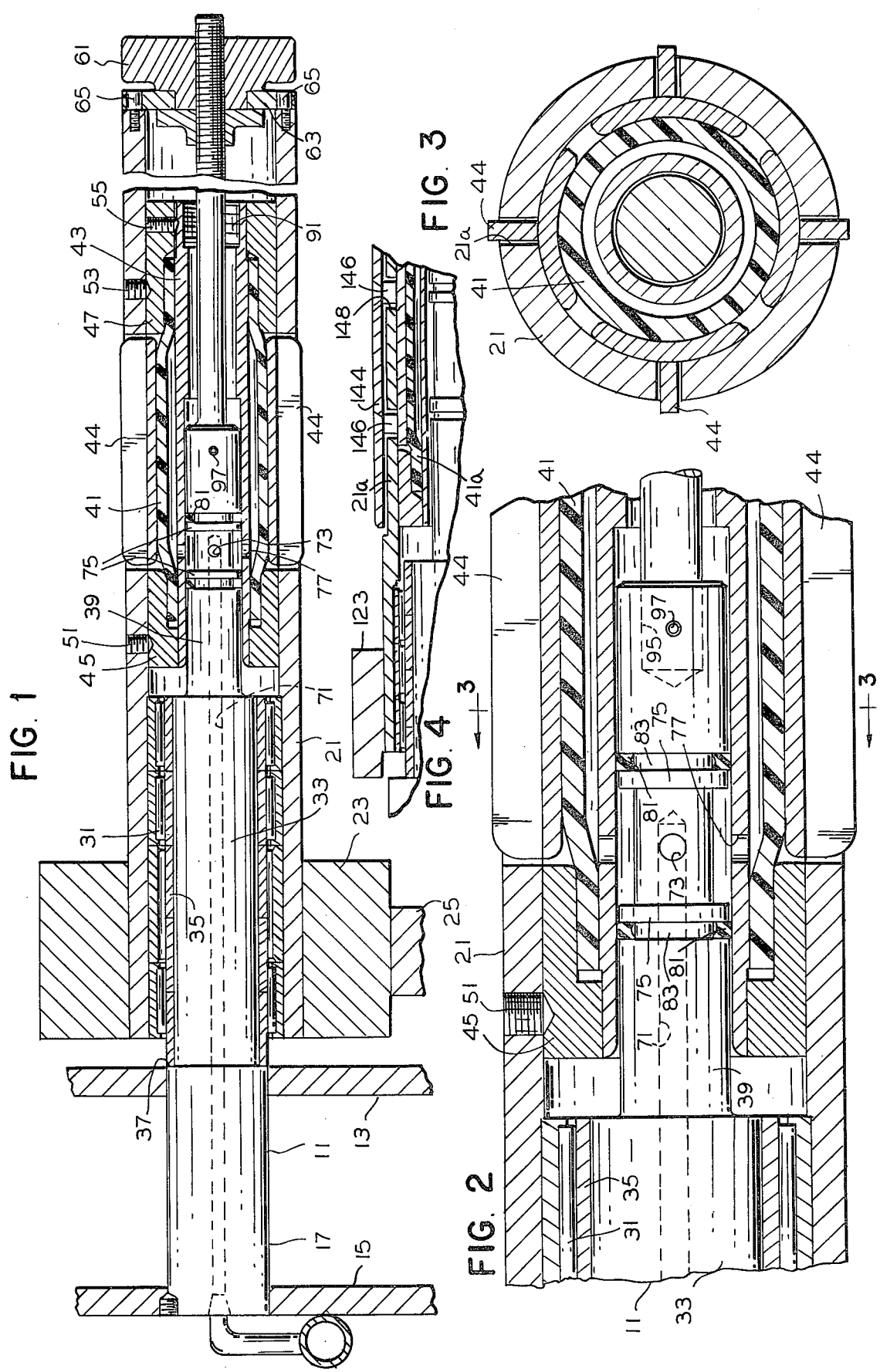

ROLL SUPPORTING MECHANISM

BACKGROUND OF THE INVENTION

At present, while air shafts are frequently used in handling paper rolls and rolls of other material, air shafts are not used for fixed spindle installations, or at least fixed spindle installations of small core diameters, such as in paper collators, because it has not been thought possible with such small diameters to provide the expandable elastomer tubes required in air shafts. Thus, to our knowledge, collators presently use mechanically expandable chucks or equivalent mechanisms. These cannot be operated or adjusted as rapidly as air shafts and must be individually operated or adjusted. Since collators have multiple spindles, it takes a significant amount of time to individually operate or adjust plural mechanical chucks when removing one set of rolls to replace them with another.

SUMMARY OF INVENTION

The present invention relates to a spindle type air actuated roll support. In accordance with the present invention, the spindle has a normal diameter inner portion to rotatably support a roll supporting sleeve, but has a reduced diameter outer portion to accommodate an expandable elastomer tube which, when expanded, acts to outwardly thrust core engaging elements or cleats into engagement with the core of the roll being supported. Air is delivered to the elastomer tube by an air passageway extending through the spindle. Thus, by controlling the supply and release of air to and from plural elastomer tubes, the core engaging elements of a number of fixed spindle roll supports can be simultaneously and readily moved into engagement with the cores of the rolls which they support, or retracted to inward positions to release the rolls for replacement.

There is also an inner mounting sleeve which surrounds the reduced spindle portion and upon which the elastomer tube is mounted and held in place by spaced collars. An adjustment mechanism connects the spindle to the roll supporting sleeve to provide for endwise adjustment of the roll supporting sleeve to thereby properly align plural rolls with one another.

It is therefore an object of the present invention to provide a roll support for a cantilever spindle that works on the air shaft principle.

Another object is to provide such a structure that can be adjusted endwise without interrupting the supply of air to the elastomer tube thereof.

A further object is to provide such a structure which can be readily assembled and disassembled.

Various other objects of the invention will be apparent from the following description taken in connection with the accompanying drawings, wherein:

FIG. 1 is a midsectional view through a roll supporting mechanism of our invention;

FIG. 2 is an enlarged view of a portion of FIG. 1 to better show certain details;

FIG. 3 is a cross section taken along line 3—3 of FIG. 2; and

FIG. 4 is a fragmentary midsectional view of a modified form of our invention.

FIG. 1 shows a spindle 11 supported in cantilever fashion from the frame members 13 and 15 of a roll collator. This is accomplished by having an end portion 17 of the spindle fitting through the frame members in fixed relation thereto.

The spindle projects through a core sleeve 21 which fits into the core of a roll to be supported. A brake hub 23 is fixed to the left end portion of the sleeve. A brake shoe 25, of common design, bears against the hub to provide the required drag or resistance to unwinding movement of the roll. The hub also functions as a stop against which the roll is abutted, whereby to determine the axial position of the roll on the sleeve.

The sleeve 21 is supported by bearings 31 on the inboard portion 33 of the spindle 11. In the specific embodiment shown, the inner races 35 of the bearings abut against a shoulder 37 on the spindle. The bearing permits endwise movement of the sleeve relative to the spindle.

The outboard portion 39 of the spindle 11 is of reduced diameter to provide a space between such outboard portion and the sleeve 11 to accommodate a sleeve assembly. The assembly includes an elastomer tube 41 fitting onto a rigid mounting sleeve 43, the latter having at its inner portion a sliding fit over the outboard portion 39 of the spindle 11. The tube 41 is surrounded by plural core engaging cleats 44 which are generally T-shaped, as shown in FIG. 3, and have the lug portions thereof projecting through slots 21a formed in the sleeve 21. The base portions of the cleats are curved to conform to the interior of the sleeve 21.

The ends of the elastomer tube 41 are held against outward expansion by a pair of spaced collars 45 and 47 which fit on the ends of the mounting sleeve 43 and are recessed to slidably accommodate the ends of the elastomer tube 41.

The inner collar 45 is held in position relative to the core sleeve 21 by a setscrew 51. However, the collar is not secured to the mounting sleeve 43.

The outer collar is also secured in place relative to the core sleeve by a setscrew 53, and is secured in place relative to the mounting sleeve by a setscrew 55.

The position of the core sleeve along the spindle can be adjusted a limited extent by manipulation of a two part nut 61 which threads on the outer end of the spindle and applies end thrust to the sleeve and determines its position by means of a split flange 63. The latter fits into a groove formed in the nut and is secured to the end of the core sleeve by screws 65. Access to the screws is furnished by notches (not shown) in the nut 61.

When the nut is turned one way, the core sleeve 21 is adjusted inwardly whereby to inwardly adjust the position of the sheet or strip being unwound, relative to the sheets or strips of adjacent rolls on the collator, whereby to align the sheets or strips. If the nut is turned the other way the core sleeve 21 is adjusted outwardly.

Air is supplied to the interior of the elastomer tube 41, between the ends thereof, by an air passageway 71 formed in the center of the spindle. Air is supplied to the passageway by a manifold line which also supplies air to the passageways of the other spindles of the collator.

The air passageway extends along the spindle to a place beyond the inboard end of the elastomer tube 41. At such place one or more radial ports 73 are provided in the spindle so that air can pass into a space between a pair of integral collar portions 75 on the spindle.

From there, the air can pass through holes 77 in the mounting sleeve 43 and apply pressure to the elastomer sleeve, to expand it. This action forces the cleats 44 outwardly to bring the lug portions thereof firmly against the core of the supported roll, whereby such roll is rotatably supported in a desired aligned position with other rolls of the collator.

FIG. 2 best shows that elastomer air seals 81 are provided in grooves 83 to form an air seal between the spindle and the interior of the mounting sleeve 43. Preferably the interior of the sleeve is coated with a sealing grease such as a silicon grease to effect a better seal, and maintain an effective sealing relationship despite rotary movement between the sleeve assembly and the spindle.

To disassemble the roll supporting mechanism, the screws 65 are unthreaded and the flange 63 removed. Next the nut is unthreaded from the spindle, to open up the outboard end of the core sleeve 21. Next a tool, not shown, is threaded into interior threads 91 provided on the interior of the outer end of the mounting sleeve 43. Then the setscrew 53, but not the setscrew 51, is loosened to release the collar 47. Now, the interior sleeve assembly, except for the cleats 44, can be withdrawn from the core sleeve 21, leaving the collar 45 in place.

The interior sleeve assembly can be replaced by a reverse operation, with the inner end of the elastomer tube sliding into the annular space between the collar 45 and the mounting sleeve 43.

If desired, the entire sleeve assembly can be removed from the spindle 11 prior to removal of the interior sleeve assembly.

Preferably the spindle is made of two parts, the outer part comprising a solid shaft fitting into a bore 95 formed in the end of the inner part and being secured in place by a pin or setscrew 97.

The FIG. 4 construction is like the FIG. 1 form, the primary difference being that whereas the FIG. 1 form has core engaging elements in the form of cleats 44 having lug portions, in FIG. 4 such elements are in the form of leaves 144. These project longitudinally beyond the expandable portion of the tube 41a and toward the core stop 123 (which also functions as a brake hub). Because of the lesser distance between the inboard ends of the leaves 144 and the core stop 123, the leaves are able to properly support narrower rolls then are the lugs 44.

The leaves have support ports 146 projecting through holes 148 in the core sleeve 21a and anchored in arcuate tube engaging base member portions like those of cleats 44 (see FIG. 3).

The leaves 144 are expanded by an expandable tube 41a and related assembly in the same manner as that shown in FIG. 1.

What is claimed is:

1. A roll supporting arrangement comprising a spindle adapted to be mounted horizontally in projecting cantilever fashion, said spindle having an inboard portion and an outboard portion, a roll supporting sleeve to fit into the core of a roll of material and surrounding said spindle at the inboard and outboard portions thereof, bearing means between said sleeve and said inboard shaft portion, said outboard portion being of smaller diameter than said inboard portion to provide a space between said sleeve and said outboard portion, core engaging elements carried by such sleeve at said outboard portion movable radially inwardly and outwardly for engaging and disengaging the core, an elastomer tube surrounding said outboard portion at said core engaging elements and disposed in said space, an inner sleeve surrounding said spindle and disposed in said space and extending through said elastomer tube in sealing engagement with the longitudinal end portions thereof, and expansion means for expanding said elastomer tube and thereby said elements.

2. An arrangement as described in claim 1 in which said expansion means comprises a passageway in said spindle and inner tube opening into said space interiorly of said elastomer tube.

3. An arrangement as described in claim 1 in which there are collar means between the inner sleeve and said roll supporting sleeve at the ends of said elastomer tube, and retaining the end portions of said elastomer tube against expansion.

4. An arrangement as recited in claim 1 in which said expansion means comprises an air passageway in said spindle opening into said space interiorly of said elastomer tube, and spaced air seal means between said spindle and said inner sleeve to confine air delivered through said passageway to the medial region of said elastomer tube.

5. An arrangement as recited in claim 4, in which the spacing of said air seal means is sufficient to accommodate adjustment of the position of said roll supporting sleeve relative to said spindle.

6. The arrangement as recited in claim 5 including means for adjusting the position of said roll supporting sleeve relative to said spindle.

7. In a roll supporting arrangement, a spindle having an inboard end and an outboard end and adapted to be supported in cantilever fashion by the inboard end portion thereof, the spindle having an air passage extending from the inboard end to the central portion thereof, the inboard end portion having a predetermined diameter, the portion of the spindle throughout its length from the inboard end portion to the outboard end thereof being substantially smaller in diameter than said predetermined diameter, an inner sleeve fitting closely and slidably on the portion of the spindle adjacent to the inboard portion thereof and having air passage means therethrough, an elastomer tube on the inner sleeve, an inboard recessed collar and an outboard recessed collar on the end portions of the inner sleeve and clamping the end portions of the tube to the inner sleeve, an outer sleeve fitting on the collars and having a journaled portion extending over a portion of the inboard end portion of the spindle, cleat means extending through slots in the outer sleeve and engaged by the elastomer tube, bearing means between the journaled portion and the spindle, first and second fastening means locking the outer sleeve to the recessed collars, third fastening means locking the outboard recessed collar to the inner sleeve, and adjustable means connecting the outer sleeve to the outboard end portion of the spindle.

8. The arrangement as recited in claim 7 wherein the locking means are set screws.

9. The arrangement of claim 6 wherein the adjustable means comprises nut means rotatably engaging the outer sleeve and screwed onto a threaded portion of the spindle means.

10. A roll supporting arrangement comprising a spindle adapted to be mounted horizontally in projecting cantilever fashion,
- said spindle having an inboard portion and an outboard portion,
- a roll supporting sleeve to fit into the core of a roll of material and surrounding said spindle at the inboard and outboard portions thereof,
- bearing means between said sleeve and said inboard shaft portion,
- said outboard portion being of smaller diameter than said inboard portion to provide a space between said sleeve and said outboard portion,
- core engaging elements carried by such sleeve at said outboard portion movable radially inwardly and outwardly for engaging and disengaging the core,
- an elastomer tube surrounding said outboard portion at said core engaging elements and disposed in said space,
- expansion means for expanding said elastomer tube and thereby said elements,
- and adjustable locating means on the outboard end of said spindle and secured to said roll supporting sleeve to variously locate it along said spindle for conformity of the location of a roll on said roll supporting sleeve with the rolls on adjacent roll supporting sleeves.

* * * * *